Oct. 24, 1967     E. W. STURDEVANT     3,348,464
ADAPTER UNIT FOR COPYING MACHINES
Filed March 22, 1965     8 Sheets-Sheet 1

Ernest W. Sturdevant
INVENTOR.

BY *Clarence A. O'Brien*
*and Harvey B. Jackson*
Attorneys

Oct. 24, 1967 E. W. STURDEVANT 3,348,464
ADAPTER UNIT FOR COPYING MACHINES
Filed March 22, 1965 8 Sheets-Sheet 4

Ernest W. Sturdevant
INVENTOR

BY *Clarence A. O'Brien*
and *Harvey B. Jacobson*
Attorneys

United States Patent Office 3,348,464
Patented Oct. 24, 1967

3,348,464
ADAPTER UNIT FOR COPYING MACHINES
Ernest W. Sturdevant, 4105 Tulare Drive,
Silver Spring, Md. 20906
Filed Mar. 22, 1965, Ser. No. 441,719
2 Claims. (Cl. 95—73)

ABSTRACT OF THE DISCLOSURE

An adapter for copying machines for supporting and storing different sizes of copy paper and a mechanism for dispensing a selected size of copy paper by feeding a sheet of the selected size of copy paper into a dispensing opening. The dispensing mechanism is in the form of a roller engageable with the top sheet on a plurality of stakes of copy paper and being movably supported so that it may be engaged with a selected stack of copy paper. In another embodiment, a pair of feed rollers is provided for engaging the stacks of different sized copy paper with one of the feed rollers being biased to a displaced position such that a sheet of paper fed by the other roller from the other stack of copy paper may be moved towards a dispensing opening.

---

This invention comprises a novel and useful adapter unit for copying machines and more particularly pertains to a construction which will enable conventional copying machines to store and have instantaneously available for use different sizes of copy paper.

Conventional copying machines are known which contain in their lower portions a tank for a liquid activating solution for a matrix sheet, a storage chamber above the tank for receiving a supply of copy paper together with means for singly dispensing sheets from the storage supply of copy paper, placing it in contact with the matrix and withdrawing both the selected sheet of copy paper and the matrix from the machine while making a reproduction upon the copy sheet. However, such machines have the disadvantage that when it is desired to use a different size of copy paper therein, it is necessary to open the machine and replace or add to the stored supply of copy paper of one size with a replacement stack of a different size. To return to use of the size of the originally stored paper the machine must again be opened for the purpose of replacing the original size of paper or the removal of the surplus of the substituted size of paper. This is a time consuming operation which is frequently undesirable for a number of reasons.

It is therefore the primary purpose of the invention to provide a means whereby a copying machine of a conventional existent construction may be adapted to instantaneously select and supply different sizes of copy paper therefrom.

A further object of the invention is to provide means whereby the time and labor required to change from one size of copy paper to another is greatly reduced and simplified and the selection of a particular size of copy paper is substantially instantaneous.

A still further object of the invention is to provide a means in accordance with the foregoing objects which will obtain the above advantages in an existing conventional type of machine with minimum changes in the structure thereof.

A still further object of the invention is to provide a means whereby a conventional copying machine may be adapted to simultaneously store and selectively dispense different sizes of copy paper.

Yet another object of the invention is to provide a construction in accordance with the foregoing objects which will effect an improved guiding action upon the paper dispensed to thereby facilitate the ease and certainty of its dispensing operation.

A further and more specific object of the invention is to provide a device which will enable a conventional copying machine to be converted for the simultaneous storing and selective dispensing of different sizes of copy paper by the mere replacement of the conventional case unit of the machine with a modified case unit in accordance with this invention.

A still further object of the invention is to provide a device in accordance with the foregoing objects whereby the copying machine will be rendered inherently capable of stocking the full capacity of its supply chamber with a plurality of different sizes of paper in any desired proportions between the different sizes or of a single size of paper.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Although the invention, as will become subsequently apparent, is not limited to use therewith, it is deemed preferable to illustrate the invention as being applied specifically to a conventional type of copying machine such as the well-known Verifax Signet Copier model C–K manufactured by the Eastman Kodak Company of Rochester, N.Y. It is well known that this particular copying machine admirably performs its intended function of supplying photocopies of material from matrices. However, it possesses the disadvantage that it is inherently capable of making copies upon copy paper of a single size only at one time so that in order to form a copy on paper of a different size, it is necessary to open the machine, remove the stock of copy paper therein, replace it with a stack of copy paper of different size, then close the machine and resume operation. This is a time consuming operation which is frequently undesirable for various reasons. In accordance with this invention, the conventional copying machine above described is converted or adapted to enable it to simultaneously stock different sizes of copy paper in such a manner that a sheet of selected size of copy paper may be substantially instantaneously fed from the machine thereby enabling copies to be made upon different size sheets with a very great saving of time and convenience on the part of the operator.

The foregoing conversion and improvement of the Verifax Signet Copier is effected with a minimum of change in the structure of its parts consisting merely in the replacement of its case unit with a modified case unit with the other parts of the machine remaining unaltered in their operation and structure. Consequently, the act of converting the machine from one capable of handling a single size only of copy paper at a time to one capable of handling multiple sizes of copy paper is effected with a minimum of effort and expense.

In carrying out the principles of this invention in converting or modifying the Verifax Signet Copier to one capable of simultaneously storing and selectively dispensing different sizes of copy paper, there are disclosed herein by way of illustration three preferred and practical modified constructions or embodiments. While other arrangements will readily occur to those skilled in the art, it is thought that the three embodiments are sufficient as to exemplify the basic principles of the invention and preferred manners of applying them.

In each of the three embodiments there is shown a basic common structure of the Verifax Signet Copier to which the principles of this invention have been applied. The basic structural features and components of the conventionally illustrated copying machine are well known and understood and therefore their construction and operation need not be referred to herein in any detail. However, for purposes of orientation, it is to be noted that the conventional machine includes as will be more readily understood from a consideration of FIGURES 1, 2 and 3, of a base unit 10 upon which is detachably mounted a case unit 12 having a removable top unit 14 together with a supporting standard 16 carrying a source of illumination 18. Mounted in one side of the machine is a conventional automatic adjustable timing mechanism 20 while a thermostatically operated heating unit for maintaining the activating solution at a desired temperature within the machine is indicated at 22.

Disposed within the casing unit 12 is a storage chamber 24 which is customarily employed for receiving, supporting and storing a stack of copy sheets adapted to be successively dispensed and utilized during the operation of the copying machine. Further, the conventional case unit is provided with a bottom wall 26 in its chamber having, as shown in FIGURE 6, a plurality of parallel longitudinally extending upstanding ribs 28 which thus define longitudinally extending channels or troughs 30 therebetween.

Ordinarily, the supply of copy sheets rests upon the top of the ribs in readiness for feeding from the storage chamber 24.

Disposed below the bottom wall 26 is a recess, chamber or compartment 32 which thus defines a tank for receiving the activating solution.

Figure 6:
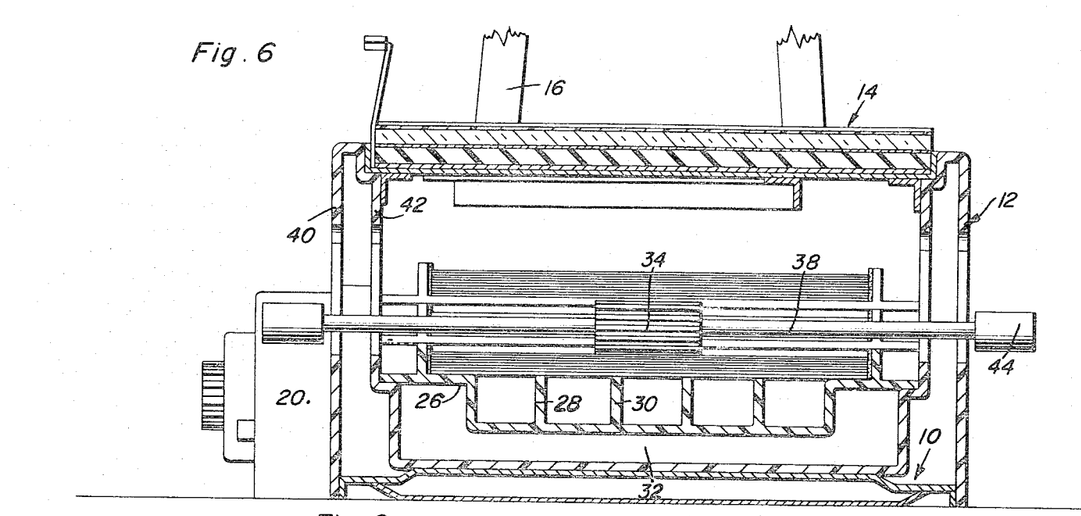
FIGURE 6 is a further detail view in vertical transverse section taken substantially upon the plane indicated by section line 6—6 of FIGURE 3.

The conventional machine further includes a copy sheet feeding means in the form of a feeding roller 34, see FIGURE 6, mounted upon an axle 38 and which is conveniently journaled in the double side walls consisting of outer and inner side walls 40 and 42 respectively of the case unit, the externally projecting ends of the axle 38 having finger-grip knobs 44 thereon whereby the roller may be manipulated. The roller is adapted to rest upon the uppermost of the stack of sheets so that upon rotation of the roller the upper sheet will be moved forwardly and dispensed through a discharge opening or dispensing opening 46 from the storage chamber 24.

The dispensing opening of the machine further includes an opening 48 from the tank 32 by means of which a matrix sheet may be slid into the activating solution or withdrawn therefrom.

Figures 1, 2:
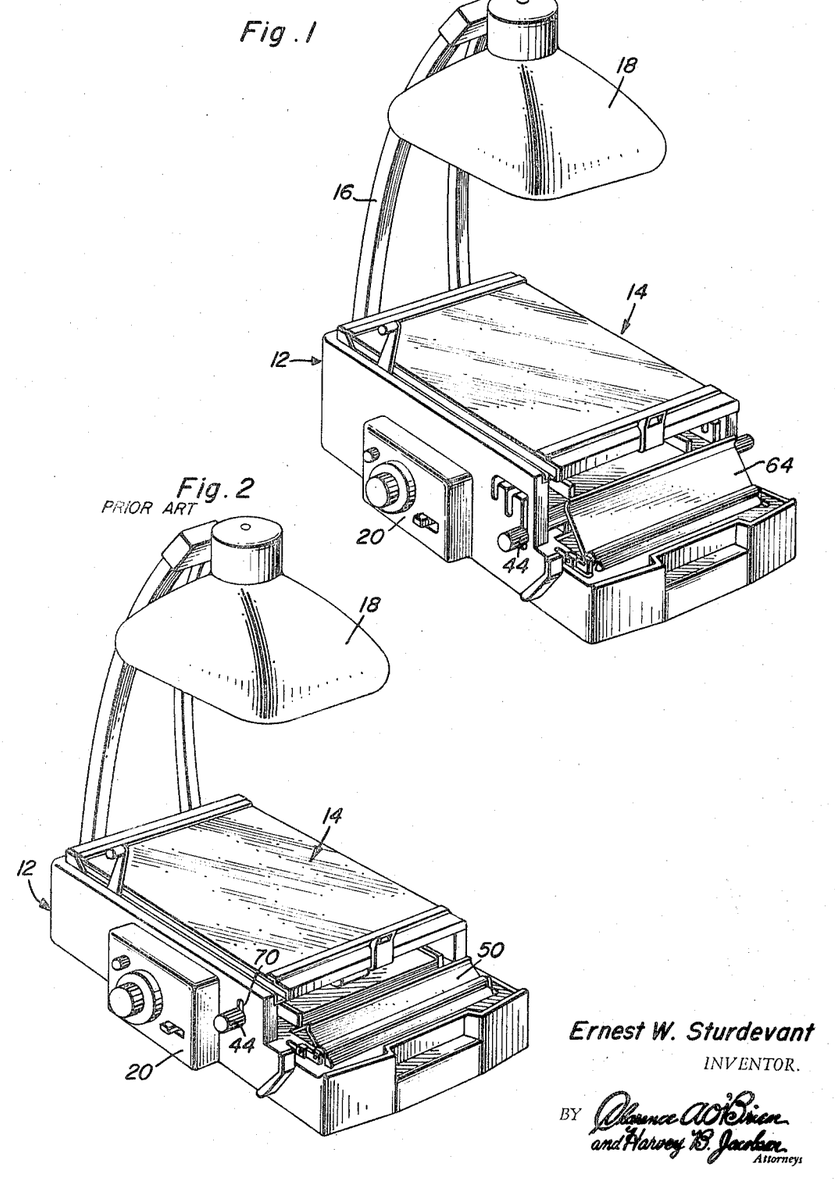
FIGURE 1 is a perspective view of a conventional copying machine which has been modified in accordance with this invention.
FIGURE 2 is a perspective view of the conventional copying machine prior to its modification for comparison with the modified machine of FIGURE 1.

Also provided upon the case unit of the conventional machine is a deflector means shown at 50 in FIGURE 2. This deflector means comprises a deflector blade extending across the openings 46 and 48 and being mounted upon the case unit being yieldingly urged by a spring into an operative position. A roller 56 is mounted upon the case unit and cooperates with a convex surface 58 at the opening 48 for the purpose of feeding a sheet of copy paper 60 from the storage chamber into face-to-face engagement with a matrix sheet 62 after the latter has been inserted into the activating solution of the tank 32 so that these two sheets as a unit package may be fed from the machine by pulling upon the exposed end of matrix 62.

Inasmuch as this operation is well understood and is conventional, a further description thereof is deemed to be unnecessary.

In converting a conventional machine of this character for the purpose of this invention the case unit thereof is replaced by the modified case unit 12, the conventional feed roller 34 is then installed in the replacement case unit, the conventional deflector means 50 is replaced by a modified deflector means 64 of sufficient large size to handle the different sizes of copy paper disposed at different vertically spaced positions within the storage chamber, the modified case unit is applied to the original base unit and the original cover unit is again associated therewith and the machine is now converted and ready for further use.

Figure 11:
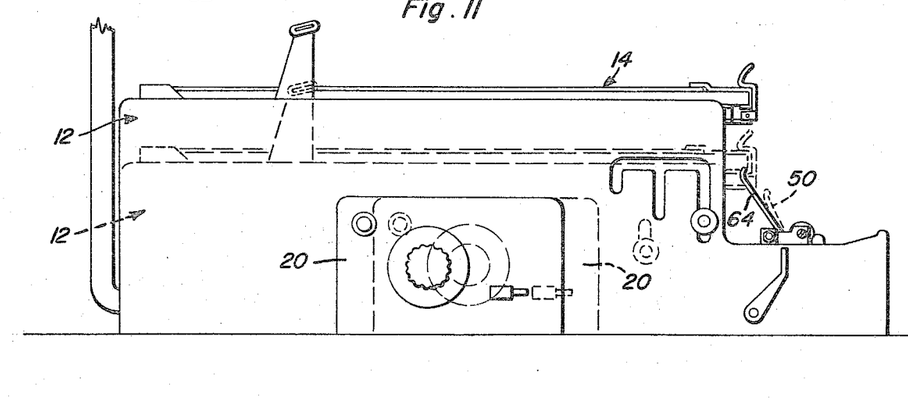
FIGURE 11 is a side elevational and comparative view of the arrangements of FIGURES 1 and 2.

In all modifications of the invention to be hereinafter described, the modified or conversion case unit 12 differs slightly from that of the original or conventional case unit in a manner which will be now more readily apparent by a consideration of FIGURES 1 and 2 in conjunction with the comparative side elevational view of FIGURE 11. The replacement case unit 12 is of a greater vertical extent than the original or conventional case unit 12 as seen by a comparison of the full line and dotted line views of the two case units in FIGURE 11. Further the replacement deflector means 64 is larger than the original conventional deflector means 50 as will be noted from a consideration of the solid and dotted line showings of these elements in FIGURE 11. Finally, the automatic timer unit 20 is displaced rearwardly upon the case unit from the original position shown in dotted line in FIGURE 11 to the full line position shown therein in order to provide further room inside the machine for the disposition and the operation of the selective copy sheet feeding means.

*Embodiment of FIGURES 1, 3–11*

FIGURES 1, 3–7 disclose a first and generally preferred embodiment for carrying out the principles of this invention. The replacement case unit 12 except for its dimensions is identical with the original case unit 12, containing the inner and outer walls 42 and 44. However, these walls are higher in order to provide a greater volume within the storage chamber 24. In the conventional unit, the stack of copy paper is placed upon the bottom wall 26, resting upon the vertically extending ribs 28 with the front end of the copy paper disposed adjacent the dispensing opening 46 of the storage chamber. The side walls 42 and 44 in the conventional case unit are provided with a single vertically extending slot 70 which permits vertical movement of the dispensing or feed roller axle 38 therein in order that the roller 34 may accommodate itself to the height of the stack of copy paper within the storage chamber, the roller resting upon the topmost sheet of the stack.

Figure 3:
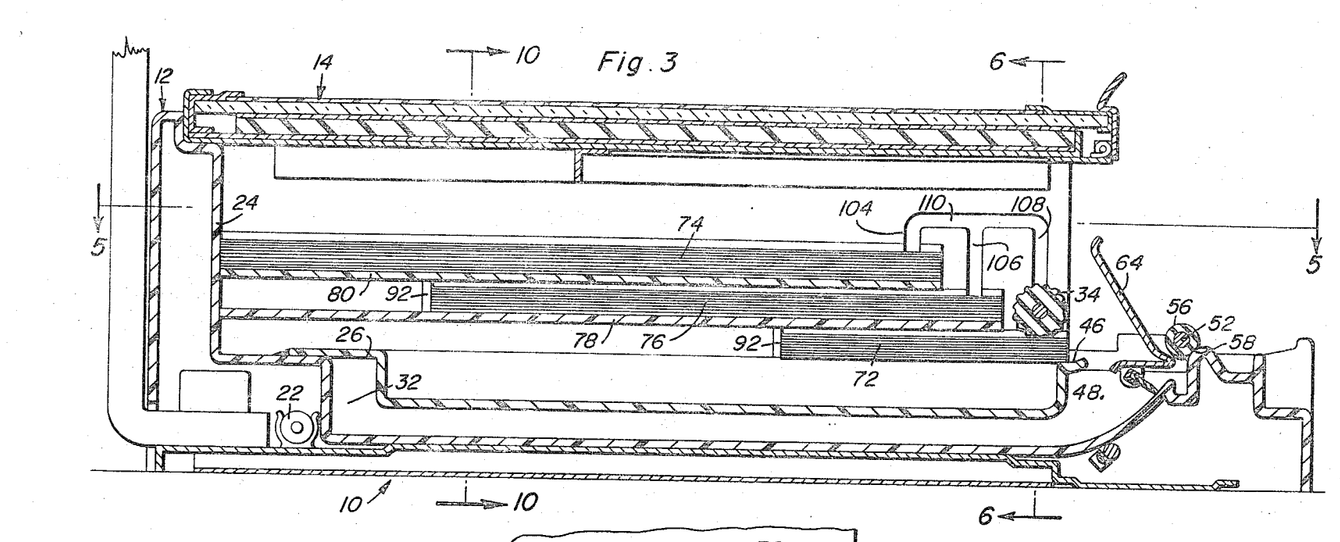
FIGURE 3 is a view in vertical longitudinal section through the machine of FIGURE 1 but taken upon an enlarged scale, parts being broken away in accordance with a preferred embodiment of this invention.

Referring now especially to FIGURE 3 it will be seen that there are disclosed three stacks of different size copy paper in the storage chamber. Thus, there is a lowermost stack 72, the topmost stack 74 and an intermediate stack 76. The front end of each of the stacks is disposed in both vertically and longitudinally spaced relation with respect to the bottom 26 and the dispensing opening 46 so that the lowermost stack is disposed forwardly, the topmost stack 74 disposed rearwardly and the intermediate stack 76 is disposed between the upper and lower stacks.

Figures 7, 9:
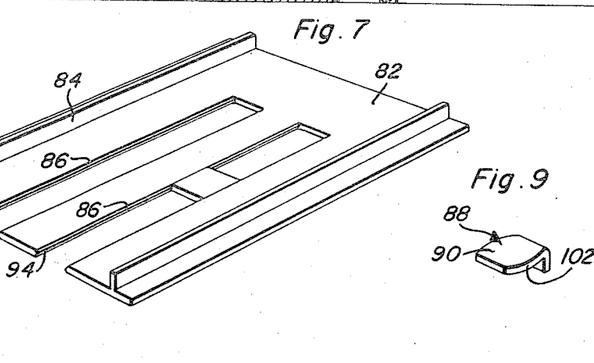
FIGURE 7 is an exploded perspective view of an adapter tray froming a part of the invention.
FIGURE 9 is a further perspective view of yet another modified adjustable stop element of the adapter tray.
Figure 8:
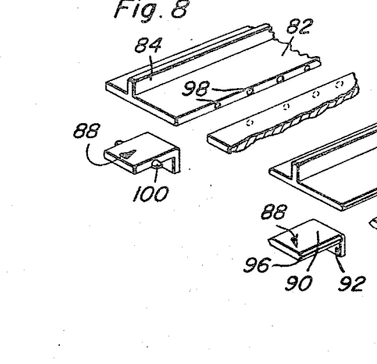
FIGURE 8 is a fragmentary exploded perspective view of a modified construction of adapter tray.
Figure 10:
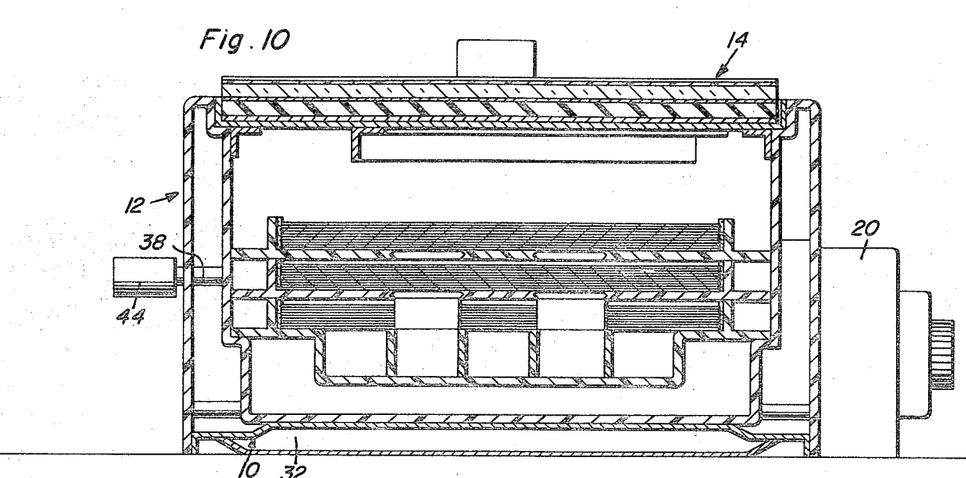
FIGURE 10 is a vertical transverse sectional detail view taken in vertical transverse section substantially upon the plane indicated by section line 10—10 of FIGURE 3.

The lowermost stack 72 rests directly upon the bottom wall 26 and the ribs 28 as in the conventional arrangement. However, the second stack 76 is disposed in a removable supporting tray 78 while the topmost stack 74 is likewise disposed in a movable tray 80. The trays are of identical construction except that as suggested in FIGURE 3, the topmost tray 80 may be shorter in length than the lower tray 78. Each tray preferably consists of a flat plate-like base 82 together with a pair of upstanding side walls or flanges 84 which are so spaced as to confine the sides of the stack 76 or 74 therebetween. Preferably the bottom wall 82 is provided with longitudinally extending slots 86 therein which overlie the channels 28 of the bottom wall of the storage chamber. Slidably and adjustably received in the channels 86 are adjustable abutment or stop members shown at 88 and which preferably comprise a horizontal flat top plate 90 adapted to be flush with the top surface of the base 82 of the tray 78 and a depending vertical flange 92 which depends beneath the tray into the space therebeneath. As shown in FIGURE 7, the inner edges of the slots 86 are provided with ribs 94 which are received in the guide channels 96 on the top plate 90 of the adjustable abutment members 88. In this manner, the abutment member can be adjusted longitudinally of their slot so as to position them in the manner shown in FIGURE 3 so that the abutment member of one tray may extend into the space therebeneath to provide a backstop or positioning member for the rear ends of the next lower stack of sheets.

Alternatively, a variety of different types of adjustable abutment or stop members 88 can be provided. In the modified construction shown in FIGURE 8, the tray base 82 may be provided with a series of longitudinally spaced recesses or detents 98 which cooperate with laterally projecting pins 100 provided upon the adjustable abutment members 88. In the still further modified form of FIGURE 9, the adjustable abutments 88 may have their top plates 90 provided with laterally enlarged portions 102 which frictionally engage in the channels 86 of the slot.

In any event, the members 88 are longitudinally adjustable upon the trays for the purpose previously set forth.

It will be observed that the trays are superposed and rest upon each other with the bottom surface 82 of one tray resting upon the upstanding side walls 84 of the next adjacent tray. Although but three stacks of different sized copy sheets are shown, it will be appreciated that the principles of the invention are not limited thereto and any desired number of such different sizes may be in the same manner stored within the storage cabinet, it being merely necessary for this form of the invention that the forward or front ends of each of the stacks be disposed in a vertically spaced and longitudinally spaced relation so as to expose the top sheet of each stack.

In addition to the provision for supporting a plurality of stacks of different size copy paper in the machine, the replacement case unit 12 further includes a novel means for mounting and adjustably positioning the feeding means or feeding roller 34. For this purpose, instead of the single vertically extending slot 70 in the side wall of the unit there are provided a system of slots consisting of a vertically extending branch slot 104 for the topmost stack of sheets 74, 106 for the intermediate stack of sheets 76 and 108 for the lowermost stack of sheets 72. The upper ends of the slots are connected by a horizontally extending communicating slot 110. The arrangement is such that the feed roller or dispenser roller 34 may be lifted in any of the slots in which the axle 38 is disposed by gripping the finger knobs 44, until it is positioned in the communicating slot 110. It may be then shifted longitudinally and then lowered into the desired slot with which the roller is then engageable with the topmost sheet of a selected stack of sheets. Thus, the same feed or dispensing roller means is adjustably shifted to a selected stack for dispensing a sheet of a desired size in a manner which is almost instantaneous in its operation.

Figure 4:
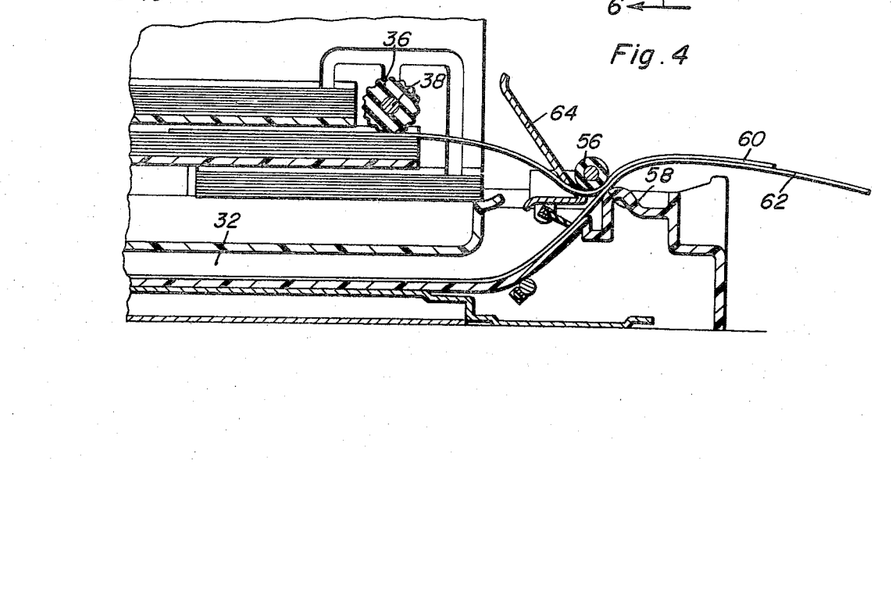
FIGURE 4 is a detailed view of a portion of the machine of FIGURE 3 but taken from the right end thereof and showing the copy paper dispensing mechanism shifted to an alternative position for dispensing a different size of copy paper from that of FIGURE 1 and with the machine being shown in the act of dispensing a matrix sheet and a copy paper sheet therefrom.
Figure 5:
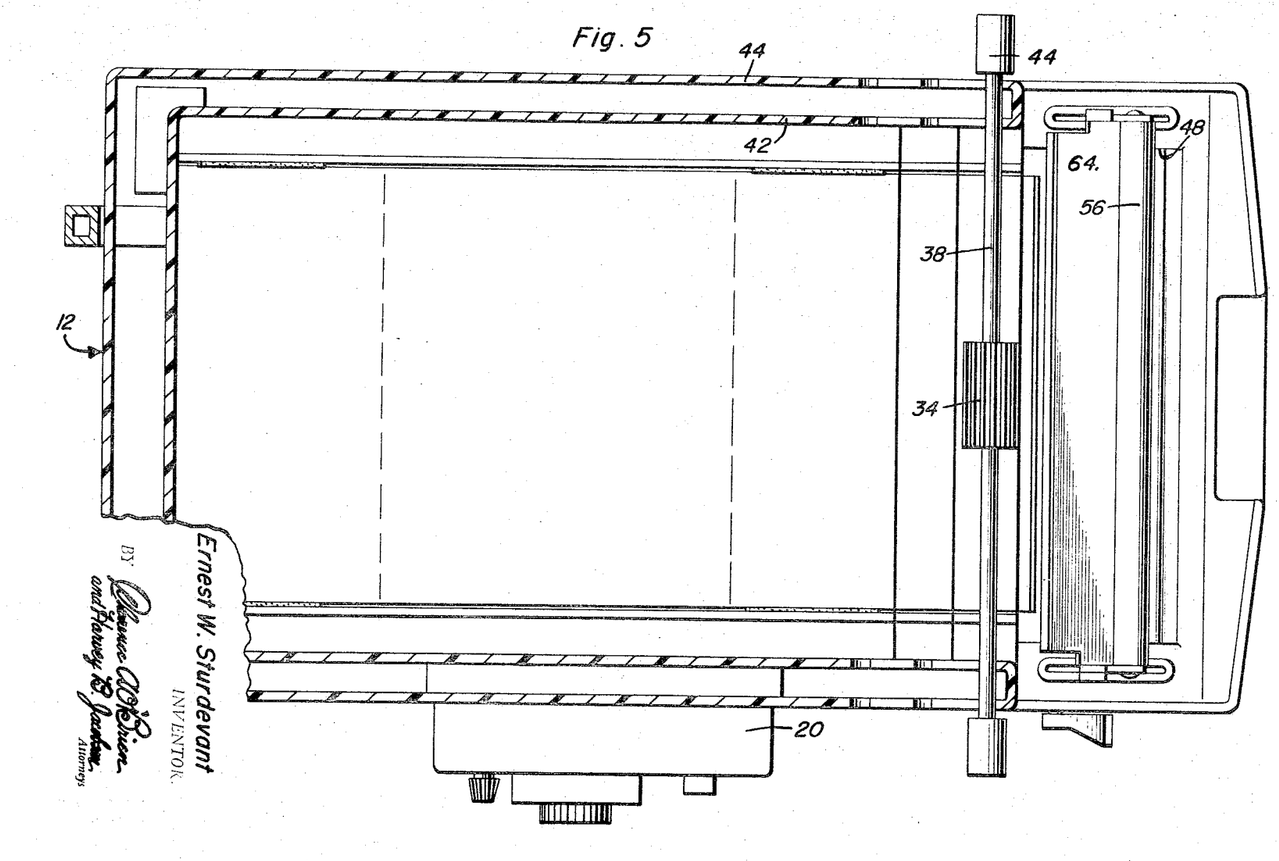
FIGURE 5 is a fragmentary view in horizontal section taken substantially upon the section line 5—5 of FIGURE 3 and showing further details of the internal construction of the invention.

When so positioned, the roller will as shown in FIGURE 3 dispense the topmost sheet of the lower stack 72 which is illustrated as being the smallest size of copy sheet. In the position of FIGURE 4, the roller is shifted to dispense a sheet from the second stack 76 which is the next largest size of sheets. As will be readily understood, when the roller is moved into the slot 104, it will engage and dispense the topmost sheet of the upper stack 74 which is the largest size of sheet.

When so positioned, the roller will displace the topmost sheet causing its front edge to engage the deflector 64 which is vertically enlarged to a sufficient extent to cause the topmost sheet to engage the deflector and be directed downwardly thereby beneath the roller 56 where it comes in contact with the matrix sheet 62 from the tank 32. The roller 56 then holds the copy sheet and the matrix sheet together as they are withdrawn as a package unit as shown in FIGURE 4 from the machine.

It will be appreciated that in some instances the finger-grip portion 44 may be threadedly engaged upon either or both ends of the axle 38 so as to facilitate removal of the dispensing mechanism from the case unit when changing the roller from the conventional case unit to the replacement case unit of this invention.

*Embodiment of FIGURES 12–18*

A second and highly satisfactory alternative manner for practicing the principles of this invention in converting the conventional copying machine in accordance herewith is disclosed in FIGURES 12–18.

In the preceding embodiment of FIGURES 1–11, the plurality of stacks of different sized copy paper were disposed in vertically longitudinally spaced relation within the storage chamber and a single feeding roller was adjustably shifted to selectively engage and operate a stack of paper of a selected size. In the second modified arrangement of FIGURES 12-18, the same vertically and longitudinally spaced arrangement of stacks of copy paper of different sizes is employed with, however, the stacks being selectively shifted so that a single vertically adjustable feed or dispensing roller may be utilized to dispense sheets therefrom.

For convenience of illustration, there is illustrated in this embodiment the provision of means for storing and supporting two stacks of copy paper of different sizes. Thus, in the case unit 120 having a bottom wall 122 and a storage or supply chamber 124 therein, there is provided the usual arrangement of longitudinally extending vertical webs 126 with longitudinally extending grooves or channels 128 therebetween. The lowermost stack of copy paper 130 is supported upon these ribs and upon the bottom wall 122, with a shiftable tray indicated generally by the numeral 132 being slidably supported upon the upstanding flanges or marginal walls 134 which confines a lower stack 130 therebetween.

Figures 12, 13, 14, 15, 16:
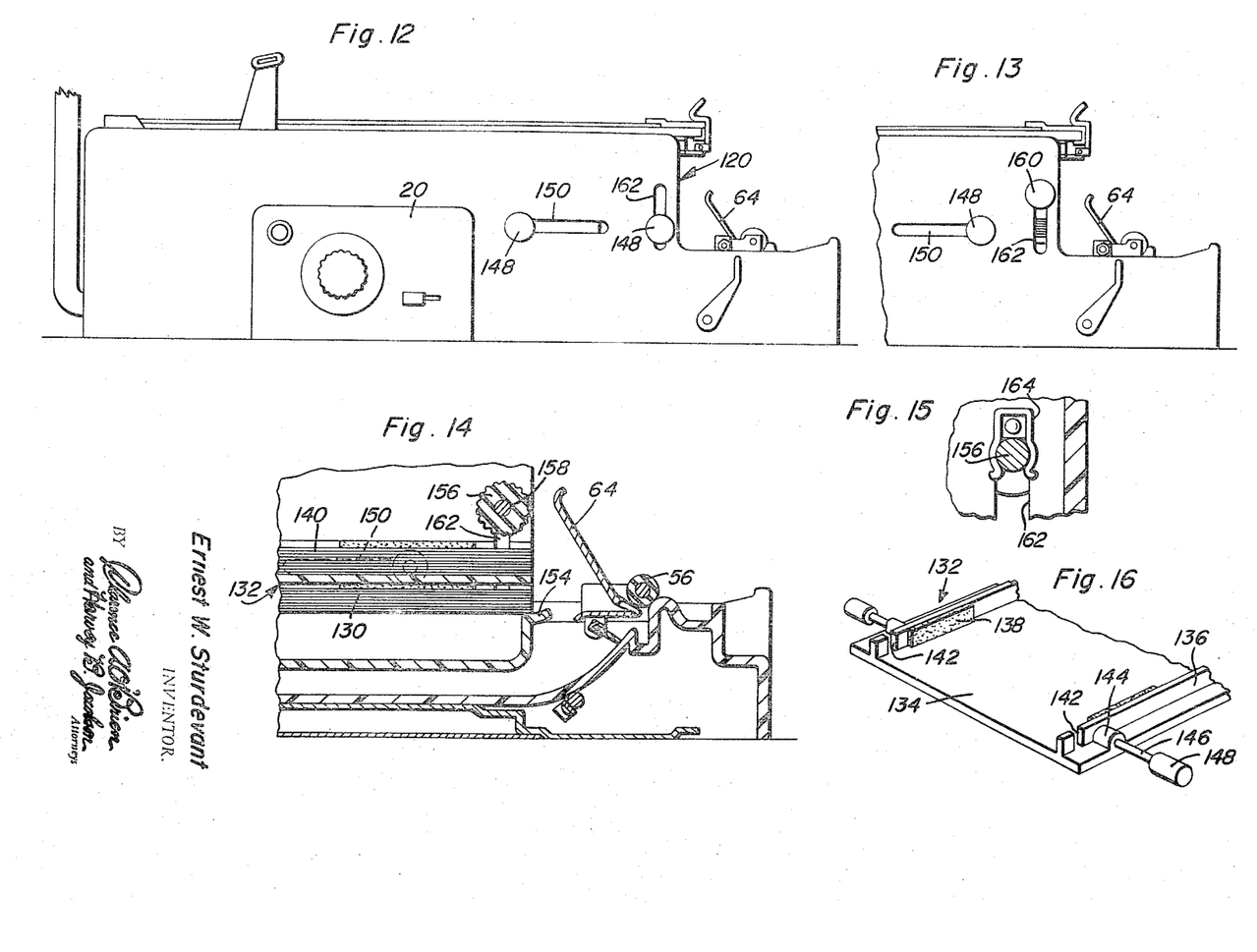
FIGURE 12 is a side elevational view of a second modification in accordance with the invention.
FIGURE 13 is a fragmentary side elevational view of the right end portion of FIGURE 12 but showing the parts in a different position for dispensing a different size of copy paper.
FIGURE 14 is a fragmentary view in vertical longitudinal section through the front end portion of the embodiment of FIGURES 12 and 13.
FIGURE 15 is a detail view in vertical section of an adjustable lock or holding means for the dispensing roller of this form of the invention.
FIGURE 16 is a fragmentary perspective view of the adjustable tray employed with this embodiment of the invention.

As will be noted from FIGURE 16, the tray 132 includes a flat plate 134 forming a bottom wall and having a pair of upstanding flanges 136 having cushioning elements such as felt or foam rubber or other material of a resilient nature 138 thereon for frictionally and resiliently confining the stack of paper 140 therein. These flanges or side walls 136 are provided with transversely aligned slots 142 therein for a purpose to be subsequently apparent. By means of transversely aligned laterally projecting internally threaded bosses 144 provided upon the flanges 136 and the base 134, a pair of guide pins 146 are detachably engaged, each of these pins having a fingergrip knob 148 upon its outer end. As shown best in FIGURES 12 and 13, the double side walls of the case unit 120 are provided with a longitudinally extending guide slot 150 in which is slidably received the pins 146. Thus, by gripping the knobs 148 the operator may slide the tray 122 and its upper stack of copy sheets 140 forwardly from a rearwardly spaced position shown in FIGURE 17 to the position shown in FIGURE 14 in which it overlies the lower stack 130 adjacent the dispensing opening 154 of the case unit. The dispensing unit comprises a feed or dispensing roller 156 carried by an axle or shaft 158 which latter is provided with removable knobs or finger-grip portions 160. The shaft 158 extends through a vertically disposed slot 162 in the case unit side wall in a position to overlie the forward or front ends of the stack of sheets. The feed roller is vertically movable in its slots 162 from a lowered position where it will engage the topmost sheet of the stack disposed therebeneath or in an upper raised position where it will be clear of the stack. The roller is retained in its upper most position as by means of resilient clips 164 suitably secured to the side walls of the case unit, as for example in the manner shown in FIGURE 18 where the clip will frictionally grip and yieldingly retain the feed roller when the latter is in its raised position.

Figure 17:
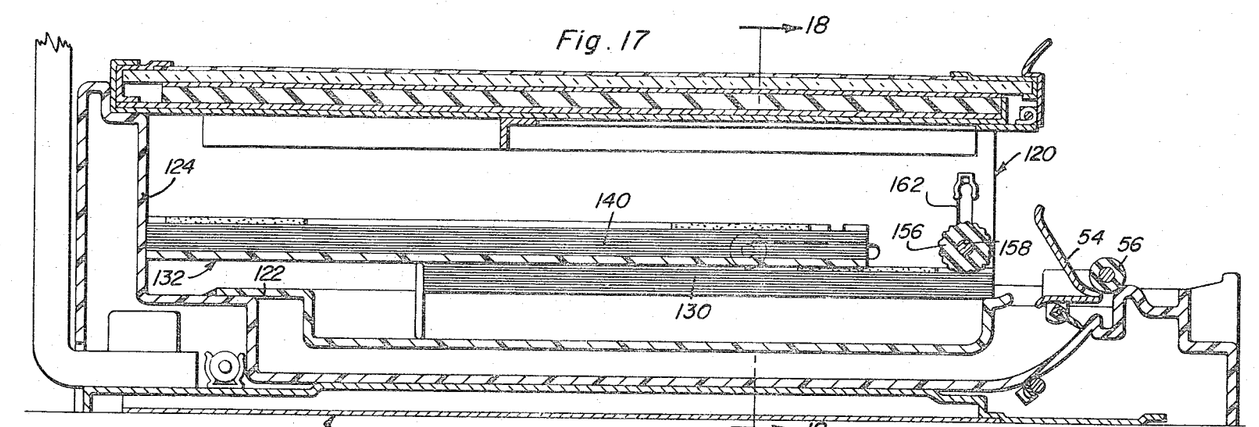
FIGURE 17 is a view in vertical central longitudinal section similar to FIGURE 14 but showing the dispensing of a different size sheet.
Figure 18:
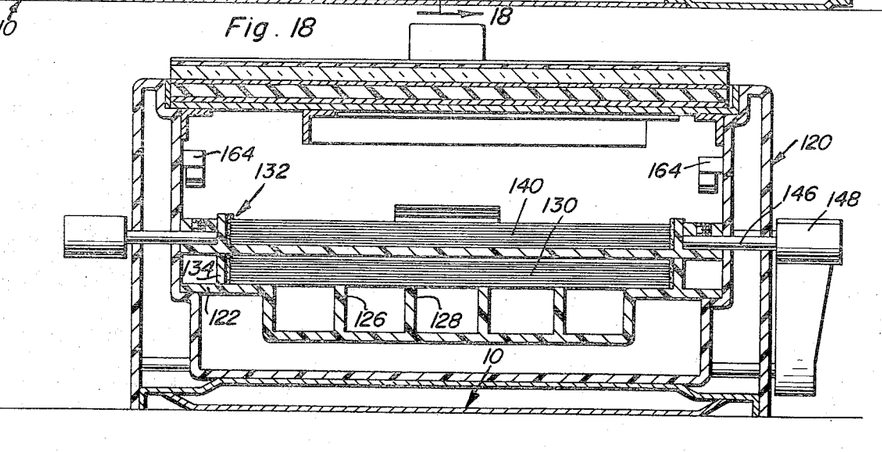
FIGURE 18 is a view in vertical transverse section taken substantially upon a plane indicated by section line 18—18 of FIGURE 17.

The arrangement is such that when the two stacks 130 and 140 are disposed in a position shown in FIGURE 17, the front ends of the stacks will be in longitudinally spaced relation so that the upper stack will be disposed rearwardly of the feed roller means while the lower stack will be disposed beneath the latter. The feed roller may then be lowered manually until it rests upon the uppermost sheet of the lower stack. Upon operation of the feed roller, the topmost sheet will be dispensed from the stack engaging the deflector means 64 previously described in connection with the preceding embodiment which will direct the sheet downwardly through the dispensing opening and a contact with the matrix sheet and cause them to pass beneath the holddown roller 56 so that the matrix and selected copy sheet may be withdrawn as a unit package in face-to-face engagement in the manner previously described and which is conventional to this type of machine.

When it is desired to dispense a copy sheet of a different size, the feed roller is lifted and held in lifted idle engagement by means of the retaining clip 164. The fingergrip knobs 148 are then gripped and the tray 132 is slid forwardly, until the pins 146 engage the forward ends of the slot 150 and the forward end of the stack 140 will be disposed directly beneath the feed roller means 156. The latter will then be lowered as suggested in FIGURE 14 so that the sheet from the upper stack 140 may then be dispensed in the manner previously described.

It will thus be apparent that the same purposes of the invention are attained by merely shifting the stacks to cause them to selectively register with the feed roller means, so that the same feed roller means can be utilized to dispense sheets from stacks containing different sizes of sheets.

Figure 19:
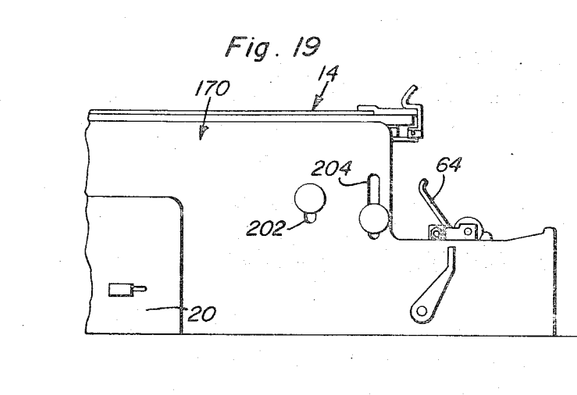
FIGURE 19 is a fragmentary side elevational view of the front portion of a third modification in accordance with the invention.
Figure 20:
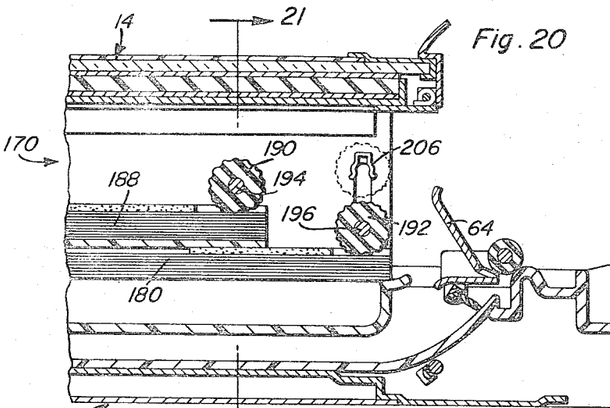
FIGURE 20 is a fragmentary view in vertical central longitudinal section of the front portion of the embodiment of FIGURE 19.
Figure 21:
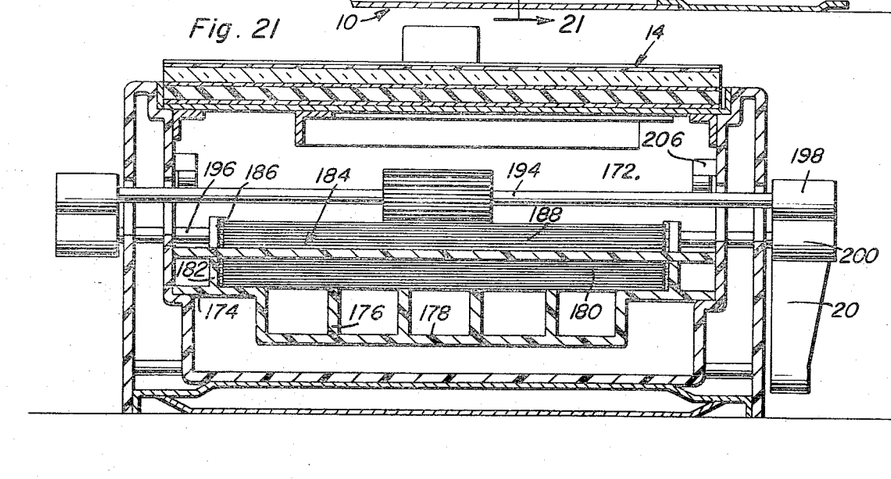
FIGURE 21 is a further detail view in vertical transverse section taken substantially upon the plane indicated by section line 21—21 of FIGURE 20.

*Embodiment of FIGURES 19–21*

A third modified construction is illustrated in FIGURES 19-21. In this arrangement there is provided the replacement case unit 170 having the replacement deflector means 64 thereon and mounted upon the base unit 10. The case unit includes the storage chamber 172 having the bottom wall 174 with the upstanding longitudinally extending ribs 176 providing longitudinally extending grooves or channels 178 therebetween and upon which is supported the lowermost stack 180 of copy paper, which is confined between the upstanding flanges or guide walls 182. A replaceable tray 184 rests upon the flanges 182 to support between the upstanding guide walls 186 a second stack 188 of copy paper of a different size.

As in the first embodiment, the two stacks of copy paper of different size are disposed with their front ends in longitudinally and vertically spaced relation in the manner shown in FIGURE 20. The dispensing means in the form of the invention comprises a plurality of feed rollers 190, 192, one for each stack, each carried upon an axle 194, 196 respectively and with each roller axle having finger-grip knobs 198, 200. The axles 194, 196 are disposed through vertically extending slots 202 and 204 respectively which are respectively positioned above the front ends of the upper and lower stacks respectively as will be apparent from FIGURE 20. Thus, each roller will engage upon the topmost sheet of the stack therebeneath for dispensing that top sheet upon rotation of the roller.

However, in order to permit sheets to be fed from the upper stack 188, past the feed roller station for the lower stack, the slot 204 is vertically elongated to a position extending above the topmost sheet of the uppermost stack 188. Resilient fastening clips 206 which may be of the same construction and mounting as the clips 164 of the preceding embodiment of FIGURES 12-18 are provided so that the forward feed roller 192 may be lifted to an inoperative position and retained therein out of the way for the feeding of sheets from the superposed stack 188.

Except for the stationary upper tray, the arrangement of the feeding means and the disposition of the stacks of sheets, this arrangement is identical in operation with those previously described.

It will thus be observed that in all forms of the invention the conventional Verifax Signet Copier has been modified and adapted by the use of the replacement case unit with associated parts so that it will now store a plurality of stacks, each of a different size of copy paper in a superposed relation and whereby easy feeding means will selectively feed a sheet from any stack therein with a minimum of delay.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a copying machine of the type for making copies from a sensitized matrix and which includes a base unit and a case unit mounted upon said base unit, said case unit having a chamber for receiving a supply of different sizes of copy paper, a tank for an activating solution disposed in said machine beneath said chamber, said machine having a dispensing opening through which a matrix and a sheet of copy paper engaged therewith may be simultaneously withdrawn and a deflector means for engaging the forward end of a sheet of copy paper when it is withdrawn from said supply in said chamber and directing it against a matrix whereby the matrix and the withdrawn sheet retained in face-to-face engagement may be withdrawn as a unit package through said dispensing opening, the improvement comprising; means in said case unit supporting and storing in said chamber different sizes of copy paper with their forward ends in vertically spaced relation and each adjacent said dispensing opening, a dispensing means mounted on said machine and selectively engageable with the forward ends of said different sizes of copy paper for feeding a sheet of a selected size of copy paper from said supply and towards said dispensing opening, said supporting and storing means comprising a plurality of trays each including a bottom, side walls, an open front and a rear, upwardly extending abutment members engageable by the rear ends of a stack of copy paper whereby to position the front end thereof at the open front end, said trays being removably supported in superposed relation, said supporting and storing means positioning the front ends of different size copy paper in vertically and longitudinally spaced relation, said dispensing means comprising a feed member, means mounting said feed member upon said machine for movement between a plurality of positions in each of which positions it is engageable with the front end of a selected size sheet, said feed member being movable and operable when so engaged to withdraw the engaged sheet from the associated stack and move it toward said dispensing opening, said feed member comprising a feed roller having an axle extending transversely of said chamber, means for effecting rotation of said feed roller, said mounting means including a series of vertical slots each disposed adjacent the front end of a stack of copy paper together with a connecting slot communicating with each vertical slot, said roller being slidably retained and movable in said slots.

2. In a copying machine of the type for making copies from a sensitized matrix and which includes a base unit and a case unit mounted upon said base unit, said case unit having a chamber for receiving a supply of different sizes of copy paper, a tank for an activating solution disposed in said machine beneath said chamber, said machine having a dispensing opening through which a matrix and a sheet of copy paper engaged therewith may be simultaneously withdrawn and a deflector means for engaging the forward end of a sheet of copy paper when it is withdrawn from said supply in said chamber and directing it against a matrix whereby the matrix and the withdrawn sheet retained in face-to-face engagement may be withdrawn as a unit package through said dispensing opening, the improvement comprising; means in said case unit supporting and storing in said chamber different sizes of copy paper with their forward ends in vertically spaced relation and each adjacent said dispensing opening, a dispensing means mounted on said machine and selectively engageable with the forward ends of said different sizes of copy paper for feeding a sheet of a selected size of copy paper from said supply and towards said dispensing opening, said supporting and storing means positioning the front ends of stacks of different size copy paper in longitudinally spaced relation, said dispensing means including a plurality of longitudinally spaced vertical slots each of which is positioned for registration with the front end of a different size of copy paper together with feed roller means movably received in said slots and selectively engageable with the front end of an associated stack of copy paper, said feed roller means comprising a separate roller movable in each slot, and means yieldingly retaining at least one of said rollers in a displaced position such that a sheet of paper fed by another roller from another stack may be moved past said displaced roller towards said dispensing opening.

References Cited

UNITED STATES PATENTS

| | | | |
|---|---|---|---|
| 1,241,897 | 10/1917 | Ananson | 271—9 |
| 3,241,485 | 3/1966 | Hodges | 271—9 |
| 3,273,883 | 9/1966 | Baronnie | 271—9 |

OTHER REFERENCES

"How to Close the Gaps in Office Communications," by Eastman Kodak Co., Copy Products Division, Rochester, N.Y., p. 13; printed November 1963.

NORTON ANSHER, *Primary Examiner.*

RICHARD M. SHEER, *Assistant Examiner.*